US012318963B2

(12) United States Patent
Heuboeck et al.

(10) Patent No.: US 12,318,963 B2
(45) Date of Patent: Jun. 3, 2025

(54) FORMWORK DEVICE

(71) Applicant: Umdasch Group NewCon GmbH, Amstetten (AT)

(72) Inventors: Christian Heuboeck, Amstetten (AT); Andreas Furtner, Neustadtl an der Donau (AT)

(73) Assignee: UMDASCH GROUP NEWCON GMBH, Amstetten (AT)

( * ) Notice: Subject to any disclaimer, the term of this patent is extended or adjusted under 35 U.S.C. 154(b) by 0 days.

(21) Appl. No.: 17/755,431

(22) PCT Filed: Oct. 30, 2020

(86) PCT No.: PCT/EP2020/080485
§ 371 (c)(1),
(2) Date: Apr. 28, 2022

(87) PCT Pub. No.: WO2021/084056
PCT Pub. Date: May 6, 2021

(65) Prior Publication Data
US 2024/0190045 A1 Jun. 13, 2024

(30) Foreign Application Priority Data
Oct. 31, 2019 (EP) .................................... 19206424

(51) Int. Cl.
*B28B 23/00* (2006.01)
*E04G 21/14* (2006.01)

(52) U.S. Cl.
CPC ........ *B28B 23/0056* (2013.01); *B28B 23/005* (2013.01); *E04G 21/142* (2013.01)

(58) Field of Classification Search
CPC .. B28B 23/005; B28B 23/0056; E04G 21/142
See application file for complete search history.

(56) References Cited

U.S. PATENT DOCUMENTS

| | | | |
|---|---|---|---|
| 10,287,785 | B1 | 5/2019 | Tadros et al. |
| 2019/0242113 | A1 | 8/2019 | Reuter |

FOREIGN PATENT DOCUMENTS

| | | | |
|---|---|---|---|
| DE | 19949419 | A1 | 5/2000 |
| DE | 102004038381 | A1 | 3/2006 |
| JP | H07259194 | A | 10/1995 |
| WO | 2016184947 | A1 | 11/2016 |
| WO | 2017174432 | A1 | 10/2017 |

*Primary Examiner* — James Sanders
(74) *Attorney, Agent, or Firm* — McCoy Russell LLP

(57) ABSTRACT

The disclosure relates to a formwork device for manufacturing a construction element, in particular a plate-shaped precast concrete element, said formwork device comprising a formwork element and a transport anchor for positioning within the construction element, the transport anchor having a connecting part for connecting a lifting device and a shear force part for introducing a shear force into the construction element, the transport anchor having a first connecting element for connecting the transport anchor to the formwork element and/or a second connecting element for connecting the transport anchor to a support element for supporting the construction element.

9 Claims, 8 Drawing Sheets

FORMWORK DEVICE

CROSS REFERENCE TO RELATED APPLICATIONS

The present application is a U.S. National Phase of International Application No. PCT/EP2020/080485 entitled "FORMWORK DEVICE," and filed on Oct. 30, 2020. International Application No. PCT/EP2020/080485 claims priority to European Patent Application No. 19206424.4 filed on Oct. 31, 2019. The entire contents of each of the above-listed applications are hereby incorporated by reference for all purposes.

TECHNICAL FIELD

The disclosure relates to a formwork device for manufacturing a construction element, in particular, a plate-shaped precast concrete element, comprising:

a formwork element, a transport anchor for arrangement within the precast concrete element, wherein the transport anchor comprises a connecting part for connecting a lifting device and a shear force part for introducing a shear force (transverse force) into the construction element.

Furthermore, the disclosure relates to a shear force anchor and a battery mould with such a formwork device and a construction element that can be manufactured using the battery mould.

BACKGROUND AND SUMMARY

Ultimately, the disclosure also relates to a method for manufacturing such a construction element and a method for supporting a finished construction element.

As is known, for example, from the DE102004038381 A1, so-called transport anchors can be used to lift heavy concrete construction elements such as precast concrete elements and the like, which are concreted into the concrete construction element in question. The known transport anchors can comprise threaded sleeves in which crane hangers, or the like are screwed in for lifting or transport purposes.

In the concreted state, the precast concrete elements are loaded by the hoist via tensile forces. When handling large-format concrete panels, however, considerable shear forces also occur, especially when the precast concrete elements are transferred from an upright state into a lying state on a substrate. In order to dissipate the shear forces into the precast concrete part, the transport anchor can comprise a shear force part, which is extended transversely to the longitudinal axis of the threaded sleeve, i.e., in the thickness direction of the precast concrete element. In order to ensure effective dissipation of the longitudinal and shear forces, precise positioning of the transport anchor in the precast concrete element is required. Furthermore, it would be desirable to extend the range of functions of the transport anchor.

Accordingly, the object of the present disclosure is to alleviate or remedy at least individual disadvantages of prior art. In particular, the disclosure has the aim of improving the insertion of the transport anchor during the manufacture of the construction element and/or to open up further functions with the transport anchor.

This object is achieved by means of a formwork device, a shear force anchor, a battery mould, a construction element, a method for manufacturing such a construction element, and a method for supporting a finished construction element.

According to the disclosure, the transport anchor comprises a first connecting element for connecting the transport anchor to the formwork element and/or a second connecting element for connecting the transport anchor to a support element to support the construction element.

Thus, the transport anchor can fulfil various functions. As is the case in prior art, the connecting part of the transport anchor serves to attach a lifting device, for instance, to a face side or a narrow side of the finished construction element. With the aid of the lifting device, the construction element can be lifted out of the formwork and placed on the substrate. Furthermore, the construction element can be lifted from the substrate via the lifting device. The lifting device may, for example, comprise a hoist, in particular, with a chain. Via the shear force part, shear forces, i.e., forces transverse to the main extension plane of the construction element, are introduced into the construction element. Favourably, a breakdown of the construction element can be delayed or prevented by this. For this purpose, the shear force part comprises at least one load transmission surface, which is distanced from the outside of the connecting part in the direction of the shear force to be dissipated, i.e., in the thickness direction of the construction element, outwardly, i.e., towards one of the longitudinal sides of the construction element. In an embodiment, two load transmission surfaces are provided for the transmission of shear forces into the construction element, which are distanced from each other in the transverse direction. The load transmission surfaces may be arranged symmetrically with respect to a median plane of the construction element. The shear forces are introduced via the connecting part and dissipated into the construction element via the shear force part which is rigidly connected to the connecting part.

According to the disclosure, the transport anchor assumes at least one further function. In a first embodiment, the transport anchor, such as on the shear force part, comprises a first connecting element, which is detachably connected to the formwork element in a reversible manner. In the connected state, the transport anchor is immovably arranged on the formwork element in a defined assembly position. Thereby, the first connecting element of the transport anchor can be brought into engagement with a corresponding connecting element on the formwork element before casting the construction element. This ensures precise positioning of the transport anchor in the construction element and thus ensures the effective dissipation of the shear forces when handling the construction element with the lifting device. Furthermore, it is favourable that the construction element is fixed to the formwork element via the transport anchor. This significantly increases the safety during stripping. After loosening the connection between the transport anchor and the formwork element, the construction element can be removed from the formwork element. In a second embodiment, the transport anchor comprises a second connecting element, in particular, on the side facing away from the formwork element. After completion of the construction element, the second connecting element can be connected to a support element, for example, a set-up support, in order to achieve reliable and simple support of the construction element, particularly on the base. The support element can be used, in particular, to support the construction element in a vertical state, such as when assembling a plurality of construction elements into a building, for example, a house. The transport anchor therefore offers a simple and stable connection point for the support element, which therefore does not have to be attached to the concrete body.

In the assembled state on the formwork device, the transport anchor is arranged in such a way in the formwork chamber between the formwork element and another formwork element that the first connecting element extends at least up to the front side of the formwork element for concrete to be applied. In an embodiment, in the assembled state, the first connecting element engages into the formwork element. The second connecting element extends to the opposite further formwork element so that the second connecting element in the concreted state is freely accessible on the corresponding longitudinal side of the construction element.

For the purposes of this disclosure, the location and direction indications refer to the concreting position of the formwork device, such as with an essentially vertical orientation of the formwork element in order to cast the construction element with the aid of the formwork device.

In order to create a simple and stable connection of the transport anchor to the formwork element, in an embodiment, the first connecting element of the transport anchor comprises a first threaded part, in particular, a threaded bolt, which is connected to a second threaded part on the formwork element, in particular, a nut. Thus, a screw connection between the transport anchor and the formwork element can be provided. However, another connection, such as a snap-in connection, can also be provided.

In order to facilitate the attachment of the transport anchor to the formwork element, the shear force part comprises a passage opening for the arrangement of the first connecting element from the side of the shear force part facing away from the formwork element in an embodiment. The passage opening may extend from the end facing away from the formwork element to the end of the shear force part facing the formwork element. During assembly, the transport anchor is first attached to the formwork element. Subsequently, the first connecting element is inserted from the outside (i.e., from the side facing away from the formwork element) through the passage opening and brought into engagement with the second connecting element on the formwork element. As a result, the transport anchor is located in the defined assembly position on the formwork element so that the precise position of the transport anchor in the poured state in the concrete body is ensured.

In some embodiments, the transport anchor is made of metal or plastic, in particular, fibre-reinforced plastic, or a compound thereof.

In order to improve the transmission of longitudinal forces to the construction element, the transport anchor may comprise an anchor bolt, in particular, with an undercut, which anchor bolt, in the concreted state, may be arranged essentially along the main plane of the construction element (i.e., in a plate-shaped precast concrete element parallel to the two longitudinal sides, which can be connected to each other by comparatively narrower front sides).

In order to enable a reversibly detachable connection of the support element, the second connecting element can be a threaded element, in particular, with an internal thread. Thereby, the support element can be connected to the threaded element via a screw connection.

In an embodiment, the connecting part comprises a connection sleeve—based on the concreted state of the construction element—reaching up to a front side of the construction element, in particular, comprising an internal thread. The lifting device can be attached to the connection sleeve, by means of which lifting device the construction element can be handled. The longitudinal axis of the connection sleeve may run essentially parallel to the main extension plane of the construction element, in particular, essentially perpendicular to the front side, at which the connection sleeve ends.

In a further embodiment, the shear force part comprises a shear force sleeve, wherein a first widening is provided at the first end of the shear force sleeve and/or a second widening is provided at the second end of the shear force sleeve. With the first or second widening, in particular, via their inner sides, a particularly effective dissipation of the shear forces can be achieved. The first and/or second widening can be designed as a disc or plate, wherein the load transmission surface can be formed on the inner side of the first or second widening. This results in a particularly large breakout cone.

In a further embodiment, a protective cap is detachably arranged on the first and/or second widening of the shear force part.

An embodiment with two formwork elements may be used, in particular, formwork panels, which are pivotably connected to each other at first end regions so that the formwork elements can be transferred from a standing state to a lying state. Such a "butterfly formwork" is known, for example, from WO 2016/184947 A1. The two such as rectangular formwork elements are each pivotably connected at a first end region, in particular, on one of their longitudinal sides. For this purpose, an articulated connection between the first end regions of the formwork elements can be provided. As a result, the two formwork elements can be transferred from a standing state, in which the formwork elements may be aligned essentially vertically, into a lying state, in which the formwork elements can be aligned essentially horizontally. In the standing state, the first end regions form the upper ends of the formwork elements, and the second end regions form the lower ends of the formwork elements. The formwork elements can be arranged in a standing state between the two bulkhead partitions of the battery mould for the manufacture of a construction element, in particular, a precast concrete element. In this case the formwork elements are in the folded (i.e., standing essentially parallel to each other) state, wherein the formwork front sides point outwardly, and the formwork rear sides face each other. The two formwork front sides delimit cavities, into which concrete can be poured. The lying state of the formwork elements, on the other hand, can be used to attach formwork units to the formwork front sides of the formwork elements, in particular, boundary elements for door cut-outs and/or window cut-outs in the construction element.

For casting the construction element, a battery mould can be used, in which a formwork chamber is formed between the formwork element of the formwork device described above and another formwork element. The other formwork element can be a single formwork panel. In addition, two further formwork elements can be pivotably connected to each other at their first end regions, as explained above in connection with the formwork device. In this case, the formwork chamber is formed between the formwork device and one of the other formwork elements. Of course, such a battery mould can be extended as desired by formwork devices and other formwork elements to form a plurality of formwork chambers for manufacturing several construction elements.

In an embodiment, the shear force part of the formwork device extends from the outside (front side) of the formwork element through the formwork chamber to the outside of the other formwork element, which outside of the other formwork element faces the outside (front side) of the formwork element. This embodiment is particularly favourable because a support between the formwork device and the other formwork element is achieved. Thereby, warpage of the formwork elements due to the concrete pressure, especially at the upper areas of the formwork elements can be reliably prevented.

The formwork device described above can be used to produce a construction element which may be a plate-shaped precast concrete element. The construction element comprises a hardened concrete body in which the transport anchor is casted. The transport anchor is therefore not subsequently inserted into the finished construction element (like a dowel or the like) but arranged in the formwork chamber before casting the construction element. The transport anchor is therefore designed as an insert.

In a particular embodiment, the shear force part extends in the thickness direction of the concrete body from one longitudinal side to the other longitudinal side of the concrete body, which may be plate-shaped.

The transport anchor described above allows a method for manufacturing a construction element with the following steps:

- provision of a battery mould,
- connecting the first connecting element of the transport anchor with the formwork element, and
- casting of the construction element in the formwork chamber between the formwork element and the other formwork element.

Furthermore, the transport anchor described above enables a method for supporting a finished construction element comprising the following steps:

- provision of the construction element,
- connecting the second connecting element with a support element, in particular, a set-up support, for the support of the construction element.

BRIEF DESCRIPTION OF THE FIGURES

The disclosure is further described below on the basis of exemplary embodiments.

DETAILED DESCRIPTION

Figure 1:
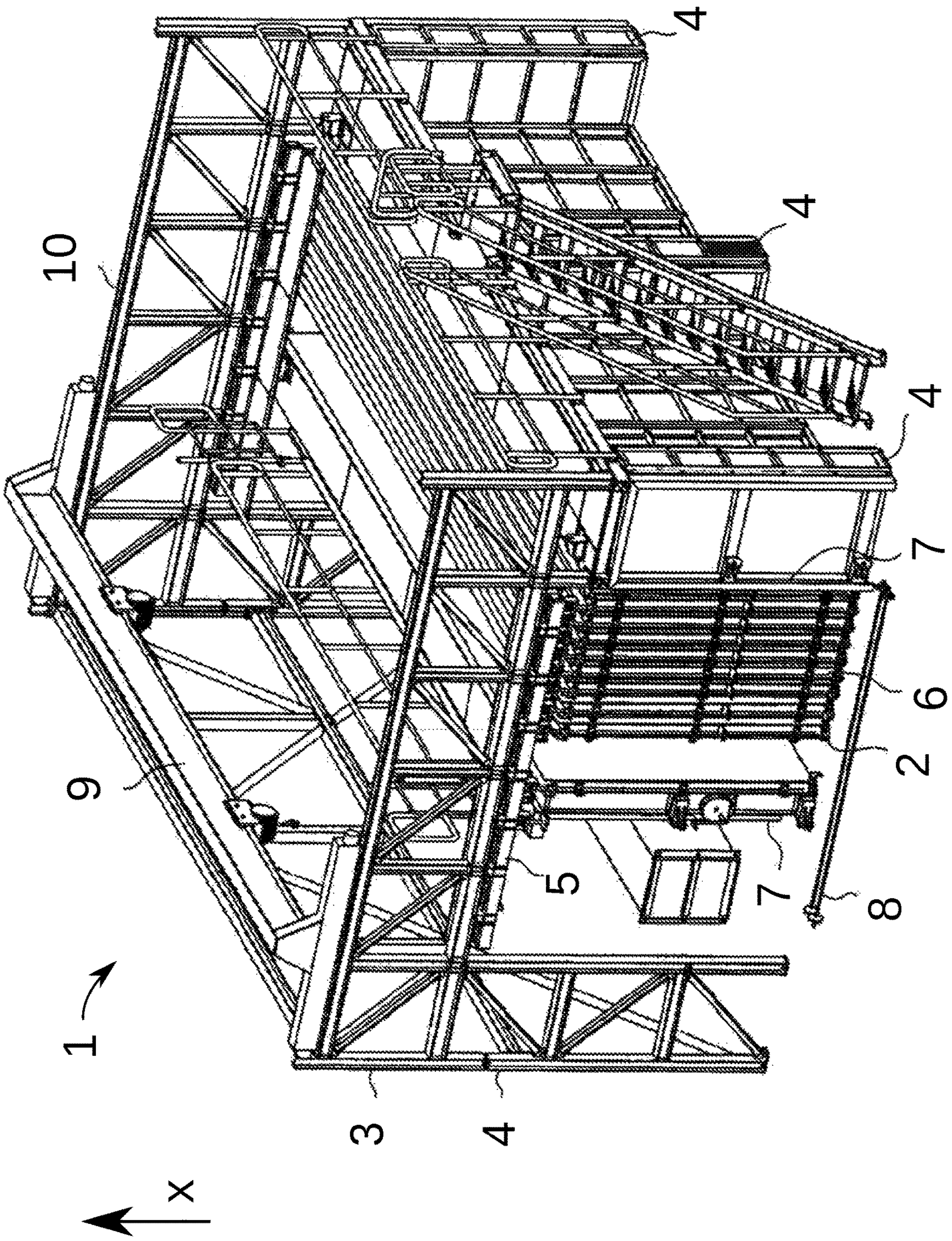
FIG. 1 shows schematically a battery mould with formwork devices.

FIG. 1 shows a schematic representation of a battery mould 1 with formwork devices 2 known, for example, from WO 2017/174432. The battery mould 1 is used for the manufacture of construction elements (not shown in FIG. 1) and in particular, precast concrete elements for buildings. The battery mould 1 comprises a carrying structure 3 with distanced support sections 4. The number of support sections 4 in FIG. 1 is only to be regarded as an example and can be adapted to the circumstances. Furthermore, the battery mould 1 comprises two support devices 5, in which the bulkhead partitions 6 and the formwork devices 2 are held in a suspended and moveable manner, i.e., in the present embodiment shiftable. The formwork devices 2 are located between the bulkhead partitions 6. Between at least one bulkhead partition 6 and a formwork device 2, a cavity to be filled with concrete is formed, wherein the formwork device 2 can support formwork units not shown, which may determine the contour of the precast concrete element. The formwork units can, for example, delimit door cut-outs or window cut-outs and also seal the cavity filled with concrete during concreting. The formwork units can, for example, be attached to the formwork device 2 using magnetic holders. In addition, a heating device (not shown) and/or a vibrator (not shown) can also be mounted on the formwork device 2. The formwork device 2 is inserted between two bulkhead partitions 6 and clamped with them during concreting. The number of support devices 5 of the bulkhead partitions 6 and of the formwork devices 2 is to be regarded merely as an example and can be varied depending on the circumstances at hand. For example, formwork devices 2 can be provided for concreting the outer walls, interior walls, the floor and the roof of a house so that, with the battery mould 1, the construction elements for an entire building can be produced simultaneously. The bulkhead partitions 6 and the formwork devices 2 are clamped between two support devices 7. The number of support devices 7 is also to be regarded as merely an example and can be varied according to the requirements. At least one support device 7 is held in the support devices 5 in a moveable manner, i.e., in the present embodiment, being shiftable. For stabilisation in the concreting position, the formwork devices 2 and the support devices 7 can be connected with each other and clamped by one or a plurality of rod-shaped connecting devices 8. The number of connecting devices 8 can be adapted to the conditions at hand. Instead of rod-shaped connecting devices 8, hydraulic connecting devices are also possible. However, the rod-shaped connecting devices 8 are particularly robust and easy to handle. Furthermore, the battery mould 1 comprises a lifting device 9, with which at least one of the formwork devices 2 can be transferred from the lowered concreting position into a raised transport position, in which the formwork device 2 can be conveyed above a formwork device 2 located in the concreting position in a direction essentially perpendicular to the lifting direction. In the case of the battery mould 1, the formwork devices 2 are hung from above into the support devices 5 so that they are distanced from the floor in the suspended state in the concreting position between the support sections 4. The design of the lifting device 9 can be adapted to the requirements. If necessary, a plurality of lifting devices 9 can also be used.

The lifting device 9 is moveable on two distanced guide devices 10, which are designed here as running rails, in a clamping direction of the formwork devices 2. Furthermore, the guide devices 10 are arranged above the support devices 5 and parallel thereto. In order to make the battery moulds 1 more compact, the formwork devices 2 are attached to the support devices 5 at their upper end.

Instead of the known formwork devices 2, the formwork devices 2 according to the disclosure can be received in the battery mould 1, which are explained in the following on the basis of FIGS. 2 to 4.

Figure 2:
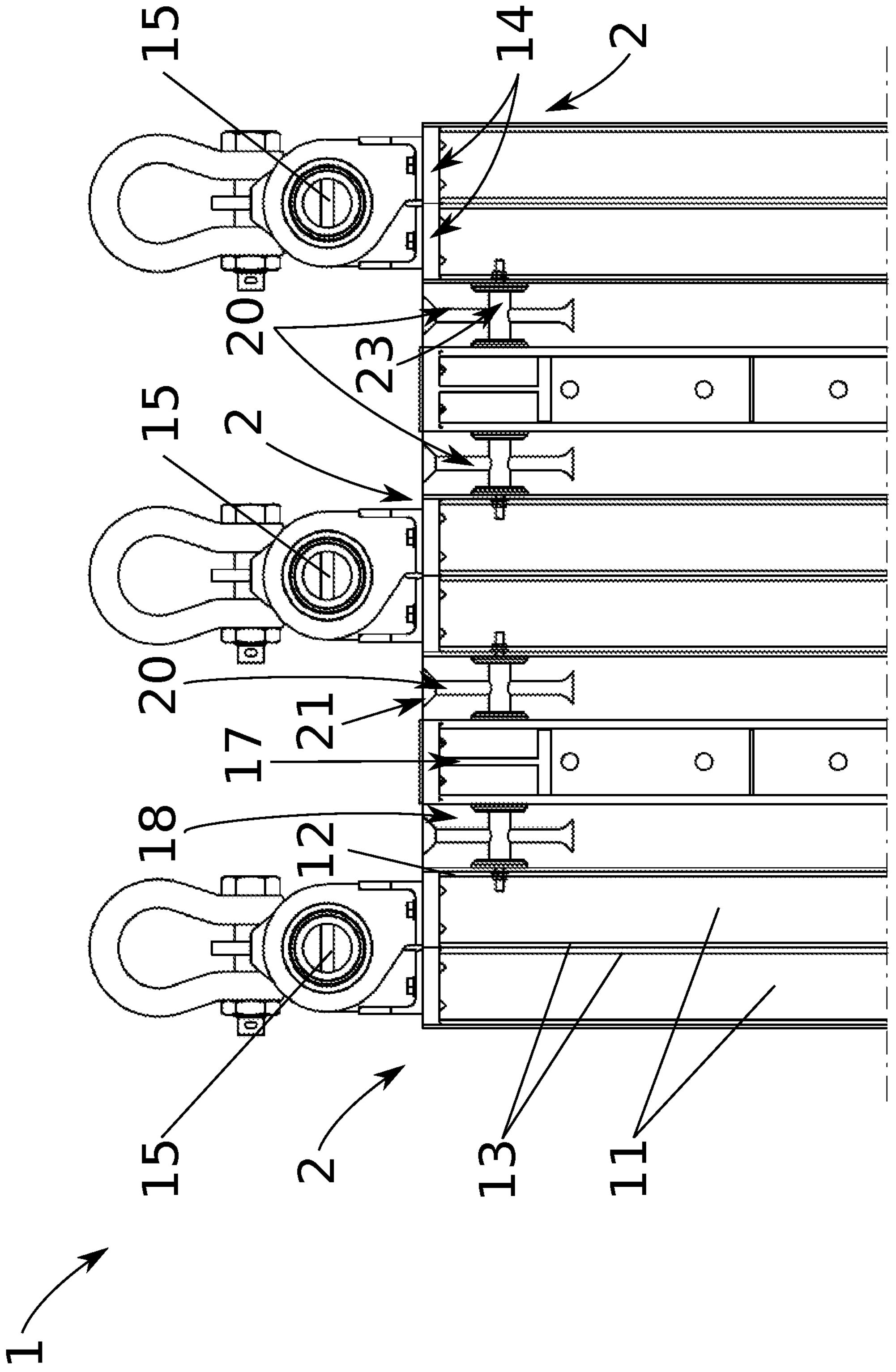
FIG. 2 shows a section of a battery mould according to the disclosure.

FIG. 2 shows a plurality of formwork devices 2, which are set up, in particular, for the arrangement between two bulkhead partitions 6 of the battery mould 1 in accordance with FIG. 1. The formwork device 2 comprises two formwork elements 11, which are formwork panels in the embodiment shown. The formwork elements 11 each comprise a formwork front side 12 for concrete to be applied and a formwork rear side 13. The formwork elements 11 are pivotably connected to each other at first end regions 14 via joints 15 so that the opposite second end regions 16 (cf. FIG. 5) can be moved apart in order to transfer the formwork device 2 from a standing state into a lying state. Between two formwork devices 2, another formwork element 17 is arranged, onto which concrete can be applied on the opposite outer surfaces. Thus, individual formwork chambers 18 are formed between the front side of the formwork element 11 and the outer surface of the other formwork element 17, which outer surface of the other formwork element 17 faces the front side of the formwork element 11.

Figure 3:
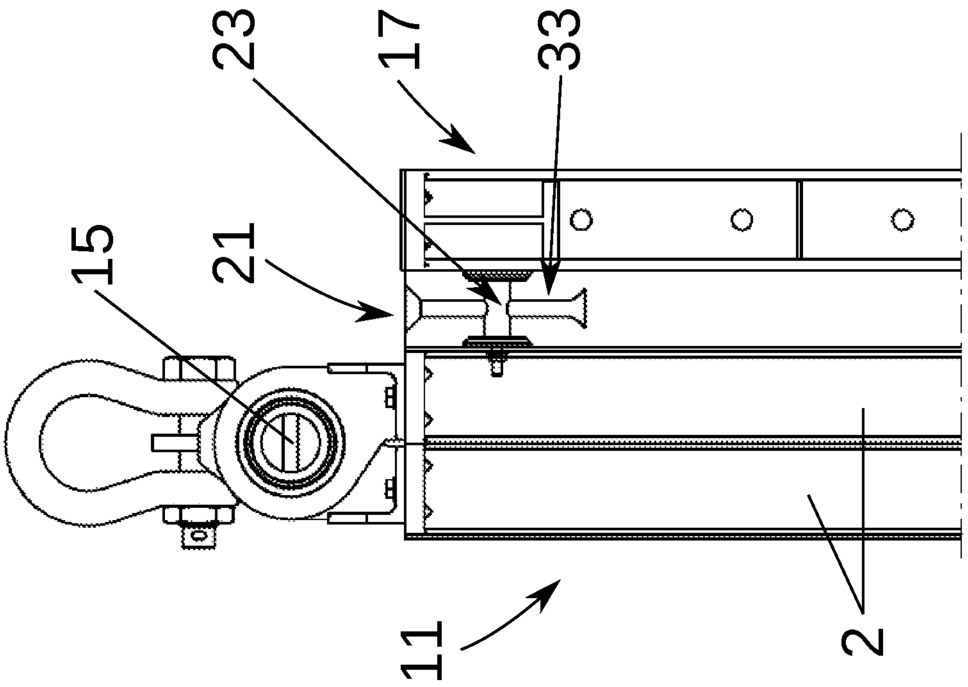
FIG. 3 shows a detail of the battery mould in accordance with FIG. 1, wherein a formwork device with two articulately connected formwork elements and a transport anchor mounted on it is visible.
Figure 4:
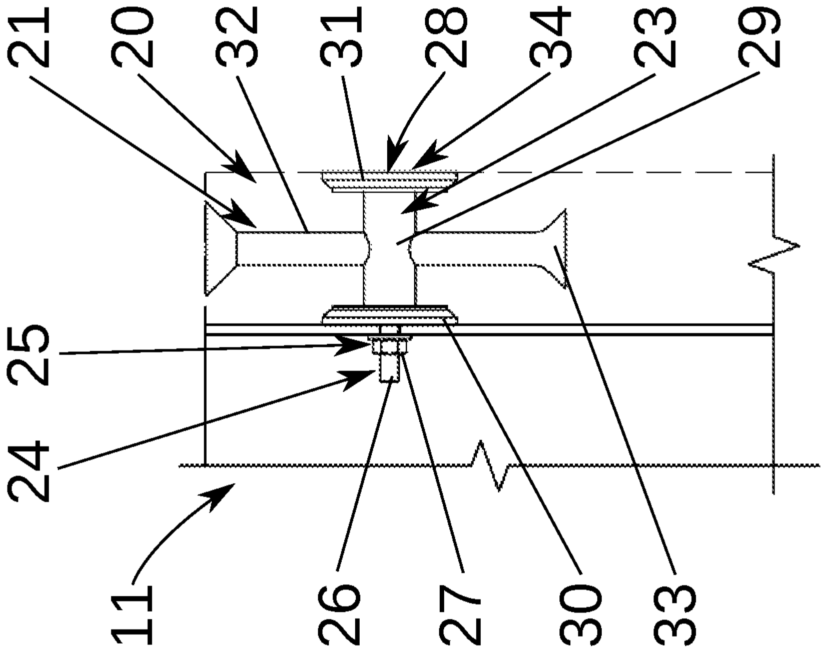
FIG. 4 shows the transport anchor in accordance with FIG. 1, 2 in greater detail.

As can be seen from FIGS. 2 to 4, before casting a construction element 19, a transport anchor 20 is detachably attached to the respective formwork element 11 of the formwork device 2. The transport anchor 20 comprises a connecting part 21, which—as will be explained in more detail below on FIGS. 4 to 6—can be connected to a lifting device 22. In addition, the transport anchor 20 comprises a shear force part 23, which extends essentially perpendicular to the connecting part 21 essentially across the entire thickness of the formwork chamber 18 (and thus of the construction element 19 to be manufactured). With the shear force part 23, shear forces can be introduced perpendicularly to the main extension plane of the construction element 19.

As can best be seen from FIG. 3, the transport anchor 20 comprises a first connecting element 24, with which the transport anchor 20 can be detachably engaged with a corresponding connecting element 25 on the formwork element 11. In the embodiment shown, the first connecting element 24 of the transport anchor 20 comprises a first threaded part, here a threaded bolt 26, which can be connected to a second threaded part on the formwork element 11, here a nut 27. The shear force part 23 comprises a passage opening 28, which extends over the entire length of the shear force part 23, seen in the thickness direction of the construction element 19. Thus, the first connecting element 24 can be plugged in from the outside through the passage opening 28 of the shear force part 23 to establish the connection with the corresponding connecting element 25 on the formwork element 11. In the embodiment shown, the shear force part 23 comprises a cylindrical shear force sleeve 29 in the middle range. At the first end of the shear force sleeve 29 (on the side of the formwork element 11), a first cross-sectional widening 30 is formed, and, at the second end of the shear force sleeve 29, a second cross-sectional widening 31 is formed.

As can be seen from FIG. 4 further, the connecting part 21 comprises a connection sleeve 32 (in the upper area conically expanding upwards), which is immovable, but detachable where applicable, connected to the shear force part 23 in order to achieve a power transmission from the connection sleeve 32 to the shear force part 23. On the connection sleeve 32, an internal thread is formed, which allows the attachment of the lifting device 22 (see FIG. 5). In the embodiment shown, an anchor bolt 33 is also provided, which protrudes from the shear force part 23 inwards, away from the front side for the attachment of the lifting device. In an embodiment, the anchor bolt 33 essentially extends in a line with the connection sleeve 32. The anchor bolt 33 improves the dissipation of longitudinal or tensile forces into the construction element 19.

Figure 9:
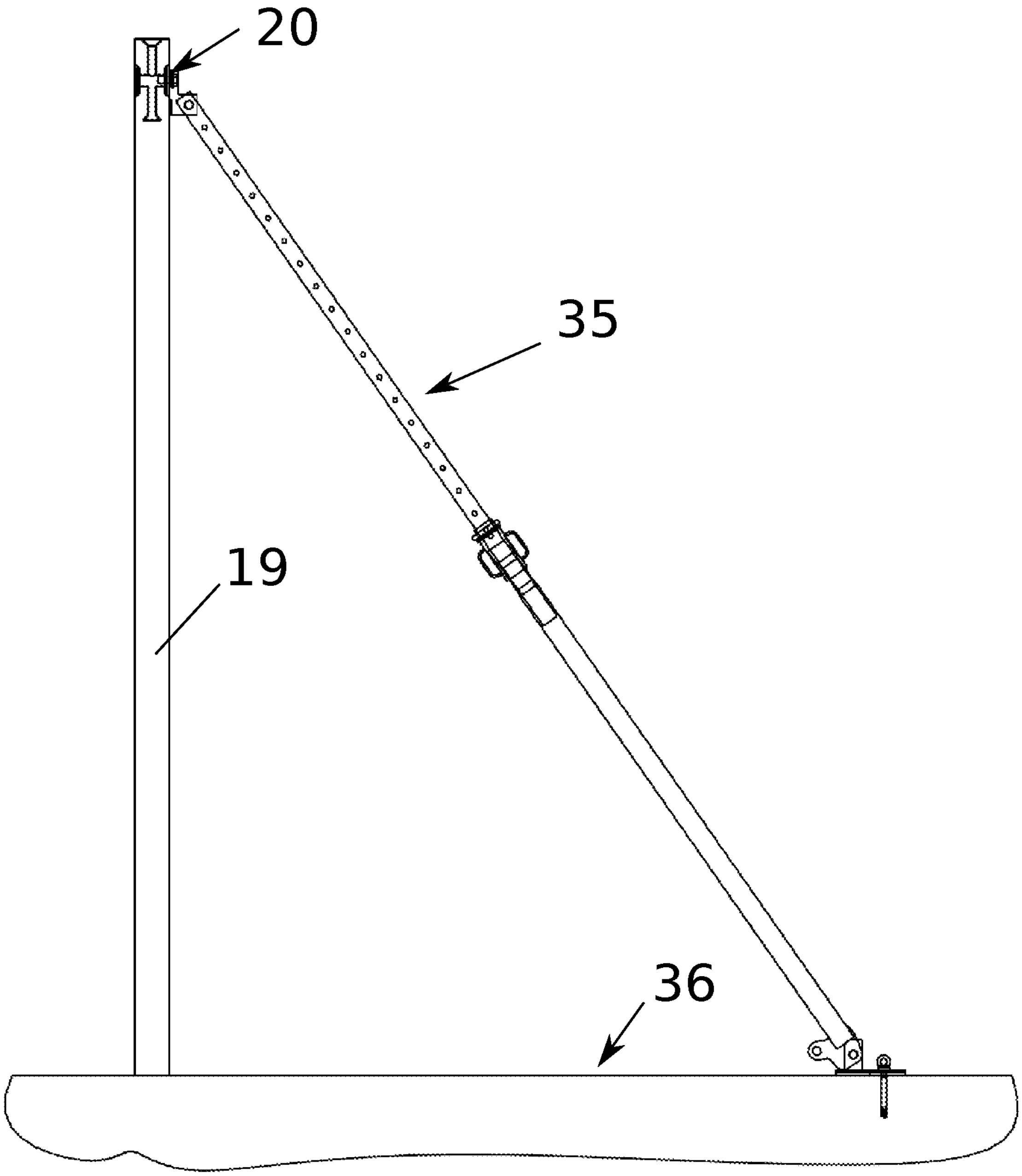
FIG. 9 shows the support of the construction element when erecting a structure with the aid of a set-up support, which is attached to the transport anchor.

In addition, the transport anchor 20 comprises a second connecting element 34, which is set up for the connection of a support element 35, for example, a set-up support (see FIG. 9). This function will be explained in more detail below using FIG. 9. The second connecting element 34 is, in particular, a threaded element, here a threaded sleeve with an internal thread, into which a screw on the set-up support is screwed.

Figure 5:
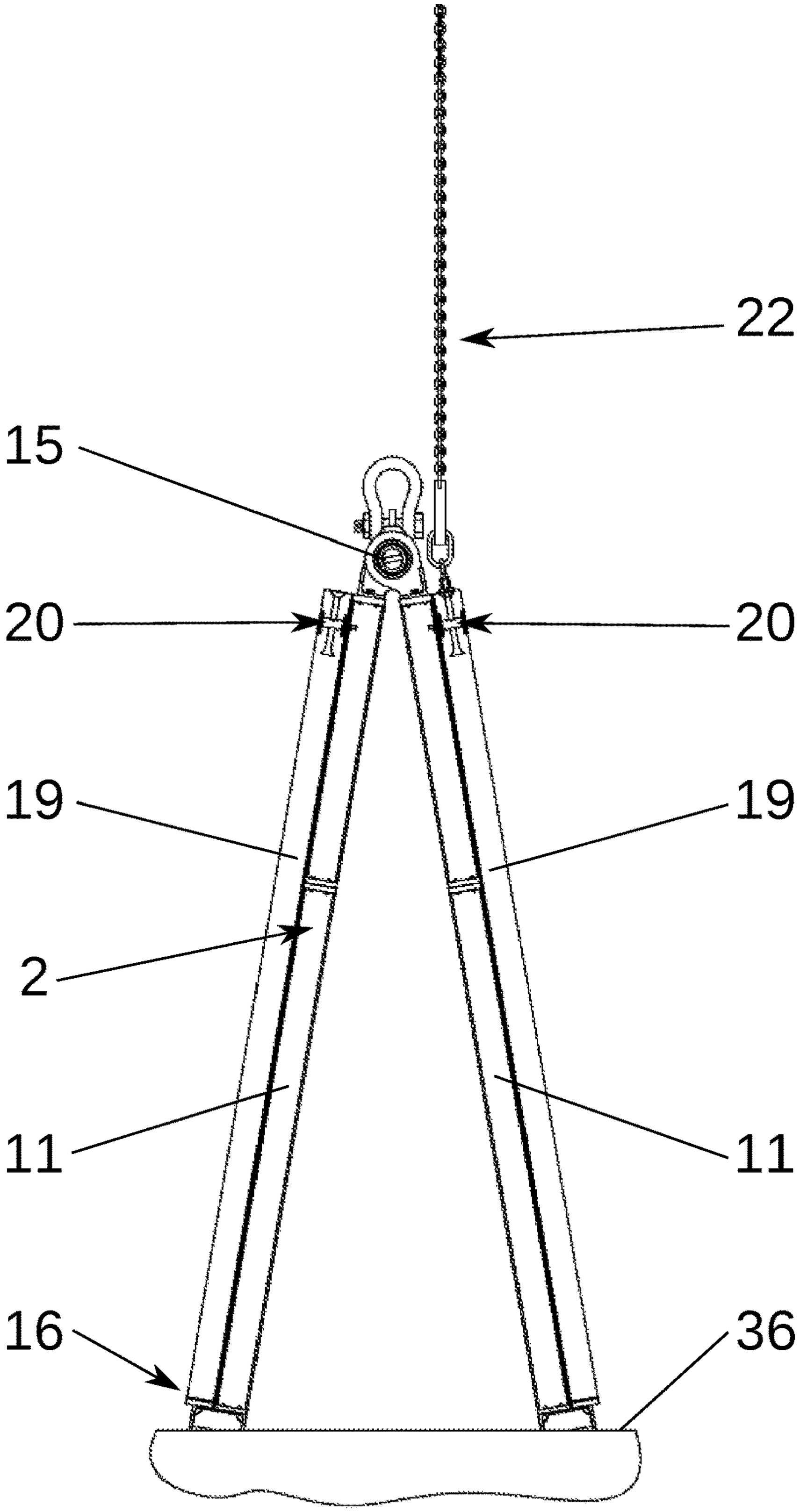
FIG. 5 shows the attachment of a lifting device to a connecting part of the transport anchor.
Figure 6:
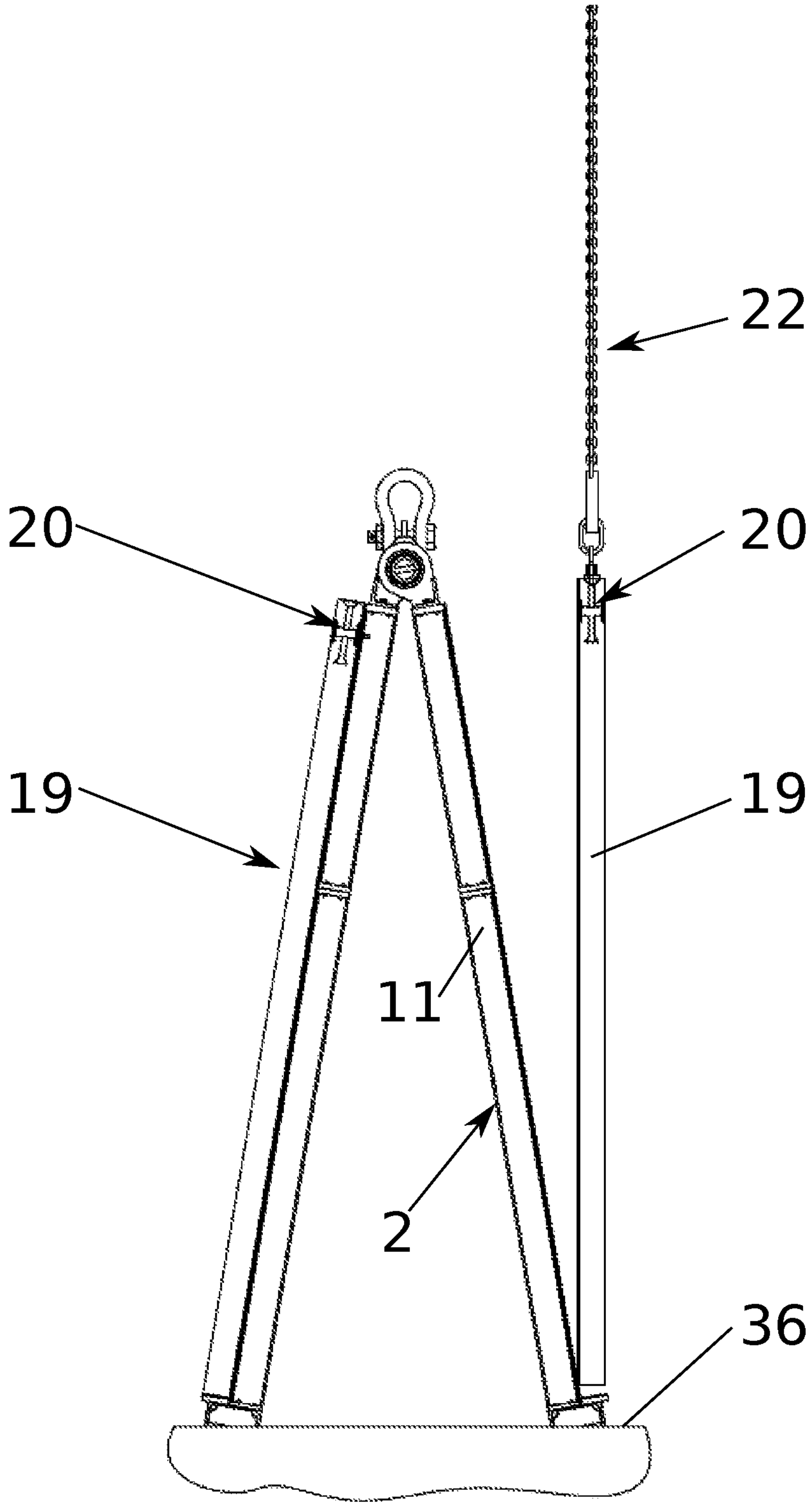
FIG. 6 and FIG. 7 show the lifting of the finished construction element from the formwork device.
Figure 7:
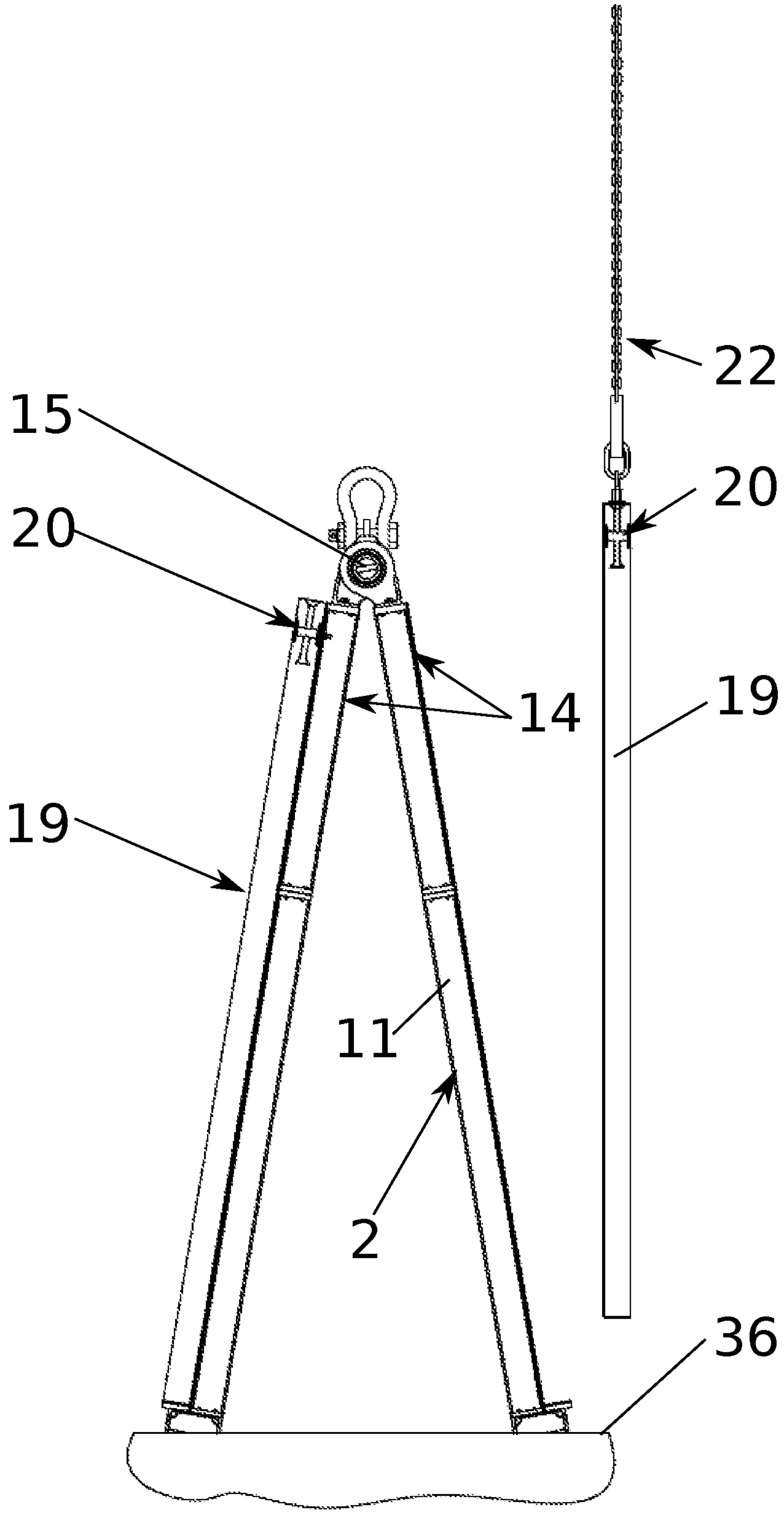
Figure 8:
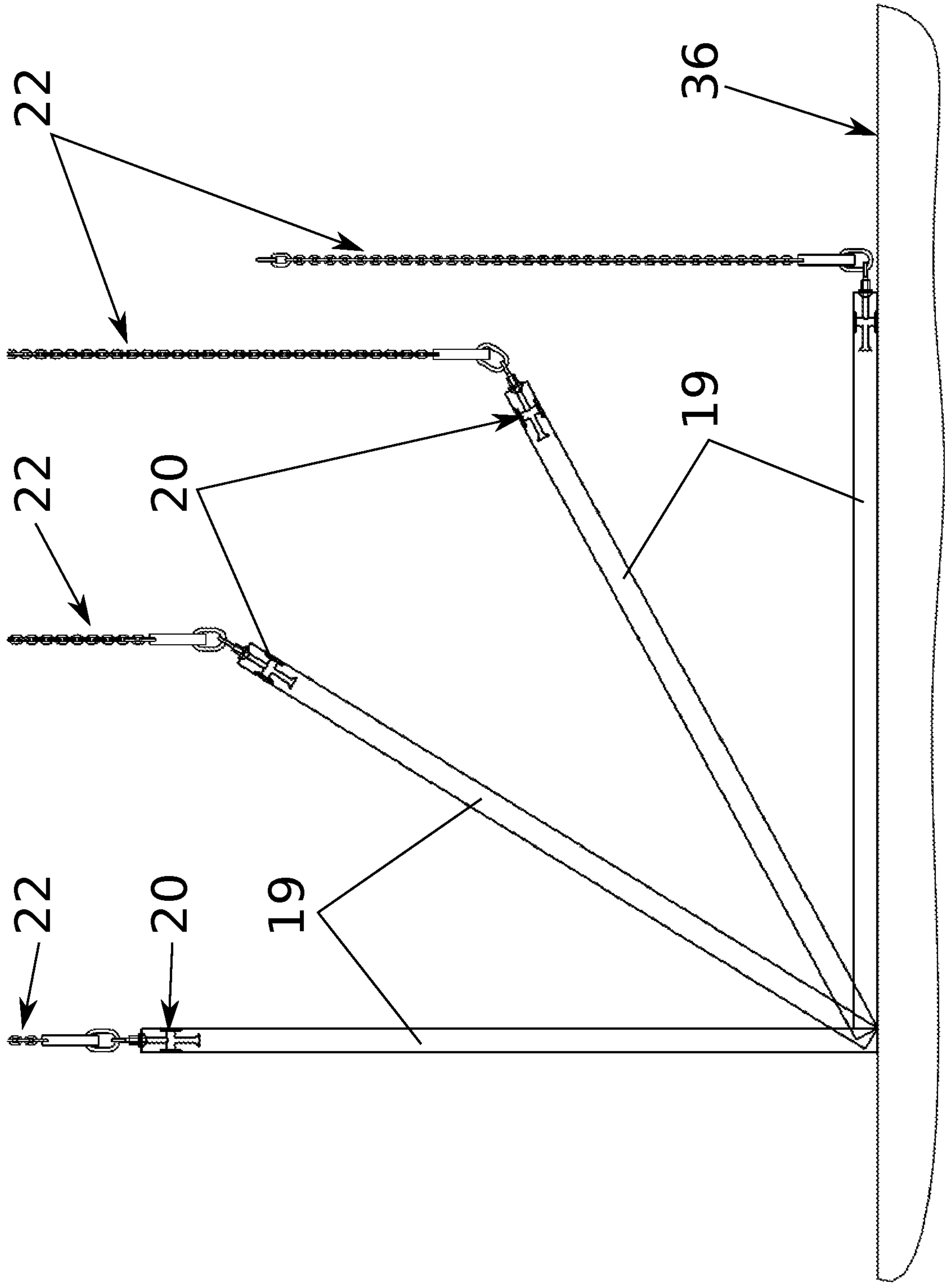
FIG. 8 shows the flipping of the construction element on the substrate in different phases.

As can be seen from FIG. 5, the formwork device 2 can be brought after casting the construction element 19 in a partially unfolded, triangular drying position at the base 36. After the complete curing of the construction element 19, the construction element 19 can be removed from the formwork device 2. For this purpose, the lifting device 22 is detachably attached to the transport anchor 20 of the construction element 19. By actuating the lifting device 22, the construction element 19 is lifted away from the formwork device 2 (cf. FIG. 6, 7). The construction element 19 can then be placed lying on floor 36 with the lifting device 22. FIG. 8 shows different phases when folding the construction element 19 from the standing state (far left) into the lying state at the floor 36 (far right). The transport anchor 20 ensures a reliable dissipation of the shear forces when the large-format construction elements 19 are placed.

FIG. 9 shows the construction element 19 in a standing state at the place of construction of a building consisting of a plurality of construction elements. The transport anchor 20 is used for the temporary attachment of a support element 35, with which the construction element 19 can be supported in an upright, standing state.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A formwork device for manufacture of a construction element, comprising:

a formwork element, a transport anchor for arrangement within the construction element, wherein the transport anchor comprises a connecting part for connecting a lifting device and a shear force part which extends transversely to the connecting part for introducing a shear force into the construction element, wherein the transport anchor comprises a first connecting element for connecting the transport anchor with the formwork element and/or a second connecting element for connecting the transport anchor with a support element for support of the construction element; and the connecting part comprises a connection sleeve and the shear force part comprises a shear force sleeve, wherein a first widening is provided at a first end of the shear force sleeve and/or a second widening is provided at a second end of the shear force sleeve.

2. The formwork device according to claim 1, wherein the first connecting element of the transport anchor comprises a first threaded part, which is connected to a second threaded part on the formwork element.

3. The formwork device according to claim 1, wherein the shear force part comprises a passage opening for an arrangement of the first connecting element.

4. The formwork device according to claim 1, wherein the second connecting element is a threaded element.

5. The formwork device according to claim 1, wherein a protective cap is detachably arranged on a first and/or second widening of the shear force part.

6. The formwork device according to claim 1, wherein two formwork elements are provided, which are pivotably connected to each other at first end regions so that the two formwork elements can be transferred from a standing state into a lying state.

7. The formwork device according to claim 1, wherein the construction element is a precast concrete element in a form of a panel.

8. The formwork device according to claim 2, wherein the first threaded part is a threaded bolt, and the second threaded part is a nut.

9. The formwork device according to claim 1, wherein the connection sleeve has an internal thread.

* * * * *